(12) United States Patent
Belik et al.

(10) Patent No.: US 11,535,361 B2
(45) Date of Patent: Dec. 27, 2022

(54) EXTRUDED WING PROTECTION SYSTEM AND DEVICE

(71) Applicant: AeroVironment, Inc., Simi Valley, CA (US)

(72) Inventors: Pavel Belik, Simi Valley, CA (US); John Peter Zwaan, Simi Valley, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 291 days.

(21) Appl. No.: 16/907,480

(22) Filed: Jun. 22, 2020

(65) Prior Publication Data

US 2020/0331584 A1 Oct. 22, 2020

Related U.S. Application Data

(63) Continuation of application No. 15/807,939, filed on Nov. 9, 2017, now Pat. No. 10,710,703.

(Continued)

(51) Int. Cl.
| | |
|---|---|
| *B64C 9/16* | (2006.01) |
| *B64F 5/10* | (2017.01) |
| *B64C 39/02* | (2006.01) |
| *B64C 13/38* | (2006.01) |
| *B64C 29/02* | (2006.01) |

(Continued)

(52) U.S. Cl.
CPC .................. *B64C 9/16* (2013.01); *B64C 3/24* (2013.01); *B64C 3/36* (2013.01); *B64C 9/02* (2013.01); *B64C 13/38* (2013.01); *B64C 29/02* (2013.01); *B64C 39/024* (2013.01); *B64D 45/00* (2013.01); *B64F 5/00* (2013.01); *B64F 5/10* (2017.01);

(Continued)

(58) Field of Classification Search
CPC .... B64C 9/16; B64C 3/24; B64C 3/36; B64C 9/02; B64C 13/38; B64C 29/02; B64C 39/024; B64C 2201/021; B64C 2201/088; B64D 45/00; B64F 5/00; B64F 5/10; Y02T 50/40
See application file for complete search history.

(56) References Cited

U.S. PATENT DOCUMENTS

| | | | |
|---|---|---|---|
| 1,342,353 A | | 6/1920 | Schnei |
| 2,779,555 A | * | 1/1957 | Danielson ................. B64C 9/16 244/216 |

(Continued)

FOREIGN PATENT DOCUMENTS

| | | |
|---|---|---|
| EP | 0338114 A1 | 10/1989 |
| EP | 0678447 A1 | 10/1995 |
| WO | 2018089583 A1 | 5/2018 |

OTHER PUBLICATIONS

International Search Report for PCT Serial No. PCT/US17/60777 dated Feb. 15, 2018.

*Primary Examiner* — Medhat Badawi
*Assistant Examiner* — Vicente Rodriguez
(74) *Attorney, Agent, or Firm* — Concept IP LLP; Pejman Yedidsion; Eric Aagaard

(57) ABSTRACT

Systems, devices, and methods for an extruded wing protection and control surface comprising: a channel proximate a leading edge of the control surface, a knuckle disposed about the channel, a leading void, a trailing void, and a separator dividing the leading void and the trailing void; and a plurality of notches disposed in the extruded control surface proximate the leading edge of the control surface.

20 Claims, 16 Drawing Sheets

Related U.S. Application Data

(60) Provisional application No. 62/421,166, filed on Nov. 11, 2016.

(51) Int. Cl.
*B64D 45/00* (2006.01)
*B64C 9/02* (2006.01)
*B64C 3/24* (2006.01)
*B64C 3/36* (2006.01)
*B64F 5/00* (2017.01)

(52) U.S. Cl.
CPC .. *B64C 2201/021* (2013.01); *B64C 2201/088* (2013.01)

(56) References Cited

U.S. PATENT DOCUMENTS

| | | |
|---|---|---|
| 2,826,379 A | 3/1958 | Alberti et al. |
| 3,093,219 A * | 6/1963 | Ramme ............... B64C 27/473 52/592.4 |
| 3,229,935 A | 1/1966 | Bellanca |
| 4,081,189 A | 3/1978 | Dumas |
| 4,213,587 A | 7/1980 | Roeseler et al. |
| 4,305,177 A | 12/1981 | Feifel |
| 4,598,889 A * | 7/1986 | Remington ............ A63H 27/02 244/130 |
| 4,971,521 A | 11/1990 | Atarashi et al. |
| 4,974,539 A | 12/1990 | Duffly et al. |
| 5,398,893 A | 3/1995 | Barker et al. |
| 5,622,336 A | 4/1997 | Chavanne et al. |
| 5,979,016 A | 11/1999 | Fan |
| 6,467,733 B1 | 10/2002 | Young et al. |
| 8,485,787 B2 * | 7/2013 | Marra ................. B21C 23/085 416/233 |
| 9,522,725 B2 | 12/2016 | Torre |
| 2006/0032975 A1 | 2/2006 | Chronister |
| 2007/0102588 A1 | 5/2007 | DuRant |
| 2008/0033108 A1 | 2/2008 | Kung et al. |
| 2008/0217470 A1 | 9/2008 | Zhao |
| 2009/0218442 A1 | 9/2009 | McAlinden et al. |
| 2009/0302167 A1 | 12/2009 | Desroche |
| 2009/0308981 A1 | 12/2009 | McAlinden et al. |
| 2011/0061579 A1 | 3/2011 | Gelder |
| 2014/0001309 A1 | 1/2014 | Tieys et al. |
| 2016/0075430 A1 | 3/2016 | Foskey et al. |
| 2017/0240281 A1 | 8/2017 | Veto |
| 2018/0093756 A1 | 4/2018 | Lorenz |

\* cited by examiner

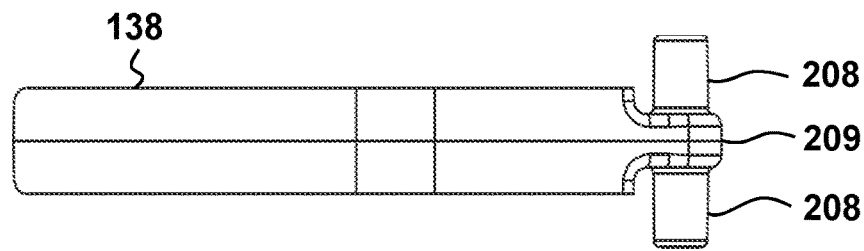
FIG. 5A
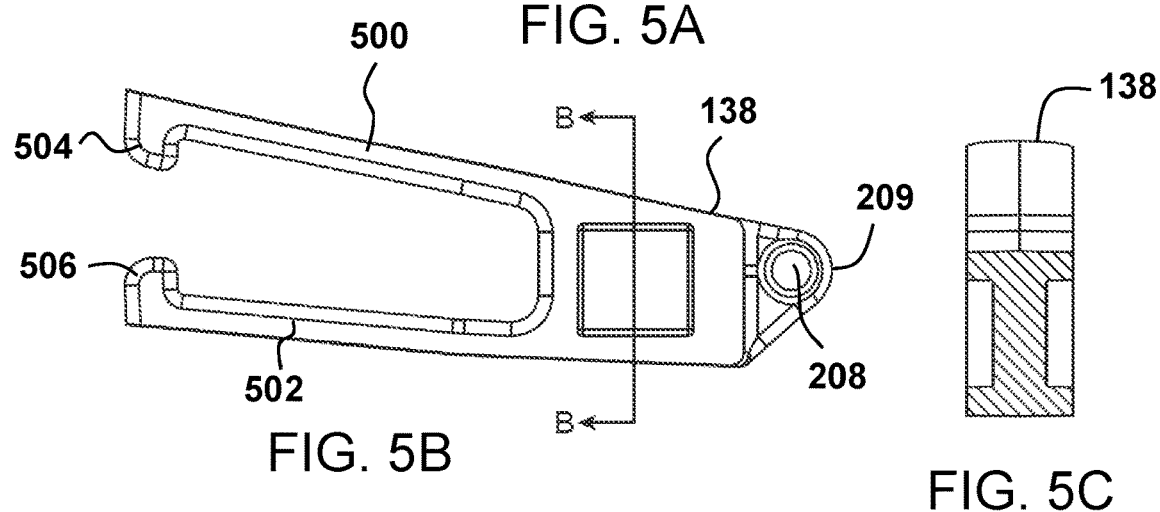
FIG. 5B
FIG. 5C
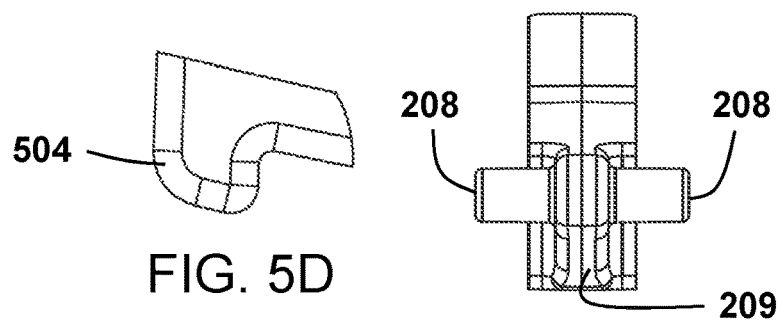
FIG. 5D
FIG. 5E
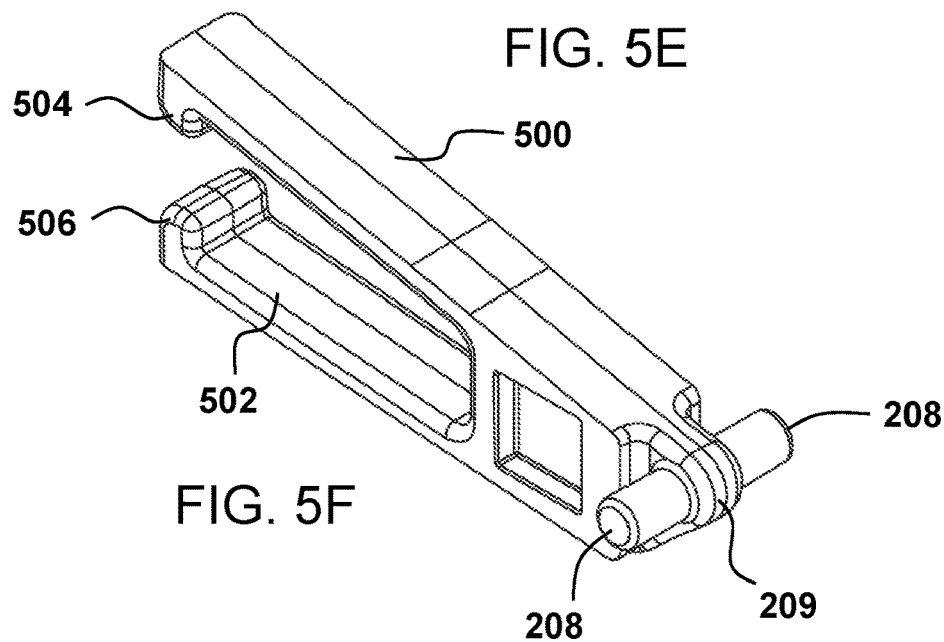
FIG. 5F

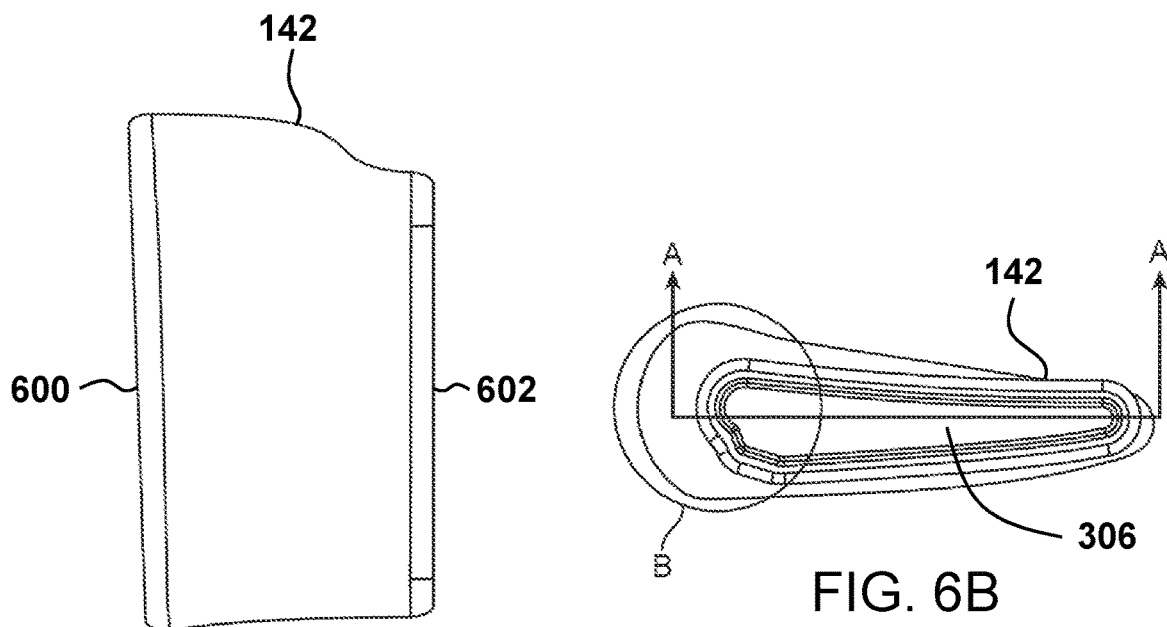
FIG. 6A
FIG. 6B
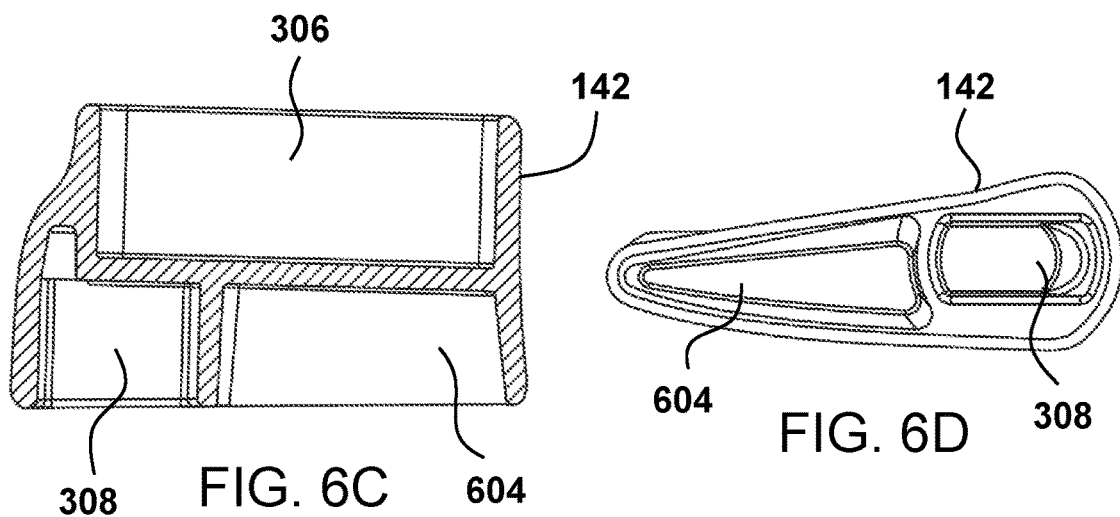
FIG. 6C
FIG. 6D
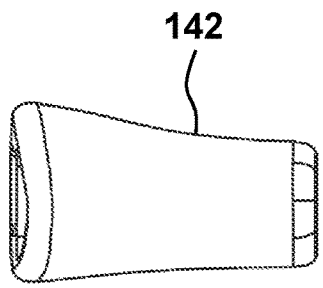
FIG. 6E

EXTRUDED WING PROTECTION SYSTEM AND DEVICE

CROSS-REFERENCE TO RELATED APPLICATIONS

This application is a continuation of U.S. Nonprovisional patent application Ser. No. 15/807,939, filed Nov. 9, 2017, which claims priority to and the benefit of U.S. Provisional Patent Application No. 62/421,166, filed Nov. 11, 2016, the contents of all of which are hereby incorporated by reference herein for all purposes.

TECHNICAL FIELD

Embodiments relate generally to unmanned aerial vehicles (UAVs), and more particularly to vertical take-off and landing (VTOL) aerial vehicles.

BACKGROUND

Flight control surfaces may be constructed using a lay-up method in which an aluminum or steel mold is created, a foam core or removable bladder is inserted into the mold, and manual labor is needed to heat the mold, take it apart, and clean it up for further use. Another option is to use injection molding, in which the control surface is constructed in two parts and assembled together. Injection molding may result in thicker, and heavier, parts.

SUMMARY

An exemplary system embodiment may include: an extruded control surface including: a channel proximate a leading edge of the control surface, a knuckle disposed about the channel, a leading void, a trailing void, and a separator dividing the leading void and the trailing void; and a plurality of notches disposed in the extruded control surface proximate the leading edge of the control surface. The system may further include: a plurality of clips, where each of the plurality of clips may include at least one pin disposed proximate a base of the clip; where the at least one pin of each clip may be received by the knuckle of the control surface via the channel, where the knuckle may deform to accept the pin, and where the control surface may pivot about each pin. The system may further include: at least one cuff, where the at least one cuff may receive an end of the control surface in a first cavity of the cuff; a second cavity disposed on a side distal from the first cavity; and a servo adapter, where the second cavity may be sized to receive the servo adapter for controlling the control surface.

In additional system embodiments, each clip of the plurality of clips may further include: a first leg having a first protrusion for insertion into an indentation on a top surface of a wing. Each clip of the plurality of clips may further include: a second leg having a second protrusion for insertion into an indentation on a bottom surface of a wing. Each pin may be disposed in a plane substantially perpendicular to a plane of the first leg. Each pin may be tapered, and a narrow end of each pin may be distal from the base. The leading void may be proximate to the knuckle. The trailing void may be proximate to a trailing edge of the control surface. The knuckle may include an opening facing towards a bottom surface of the control surface. The control surface may be made from a UV resistant plastic or a polycarbonate-ABS (PC-ABS).

An exemplary method embodiment may include: extruding a control surface, where the extruded control surface includes a channel proximate a leading edge of the control surface, a knuckle disposed about the channel, a leading void, a trailing void, and a separator dividing the leading void and the trailing void. The method may also include cutting the control surface at a set length; and milling a plurality of openings into the cut control surface proximate the leading edge of the control surface. In some method embodiments, the leading void may be proximate the knuckle, the trailing void may be proximate a trailing edge of the control surface, the separator may be narrower in width than an outside width of the control surface, and the knuckle may have an opening facing towards a bottom surface of the control surface.

Another exemplary method embodiment may include: attaching at least one clip to a wing of a vertical take-off and landing (VTOL) unmanned aerial vehicle (UAV); attaching a cuff to an end of an extruded control surface; and attaching the extruded control surface to the at least one clip proximate at least one notch in the leading edge of the control surface. The method may further include: attaching a servo connector to the cuff, where the servo connector controls movement of the control surface.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIGS. 5A-5F depict top, side, cross-sectional, close-up, front, and perspective views of an exemplary clip;

FIGS. 6A-6G depict top, left side, cross-sectional, right side, front, front perspective, and rear perspective views, respectively, of an exemplary cuff;

DETAILED DESCRIPTION

The present system allows for a flight control surface that may be manufactured by the extrusion of material, such as a plastic, through a die. Embodiments disclose an extrusion process, used to create objects of a fixed cross-sectional profile, for control surfaces where material may be pushed through a die of the desired cross-section. Extrusion of material may provide benefits of simplifying, speeding-up, and greatly reducing the cost of manufacturing the control surface. By utilizing an extruded control surface with two voids and a separator dividing the voids, the control surface may be light, having thin walls, and inexpensive to produce, while retaining structural integrity and strength. Such structural integrity of different parts of a UAV allow the overall structure to hold together under a load or impact, including any weight exerted on the UAV, without breaking or deforming excessively.

Figure 1A:
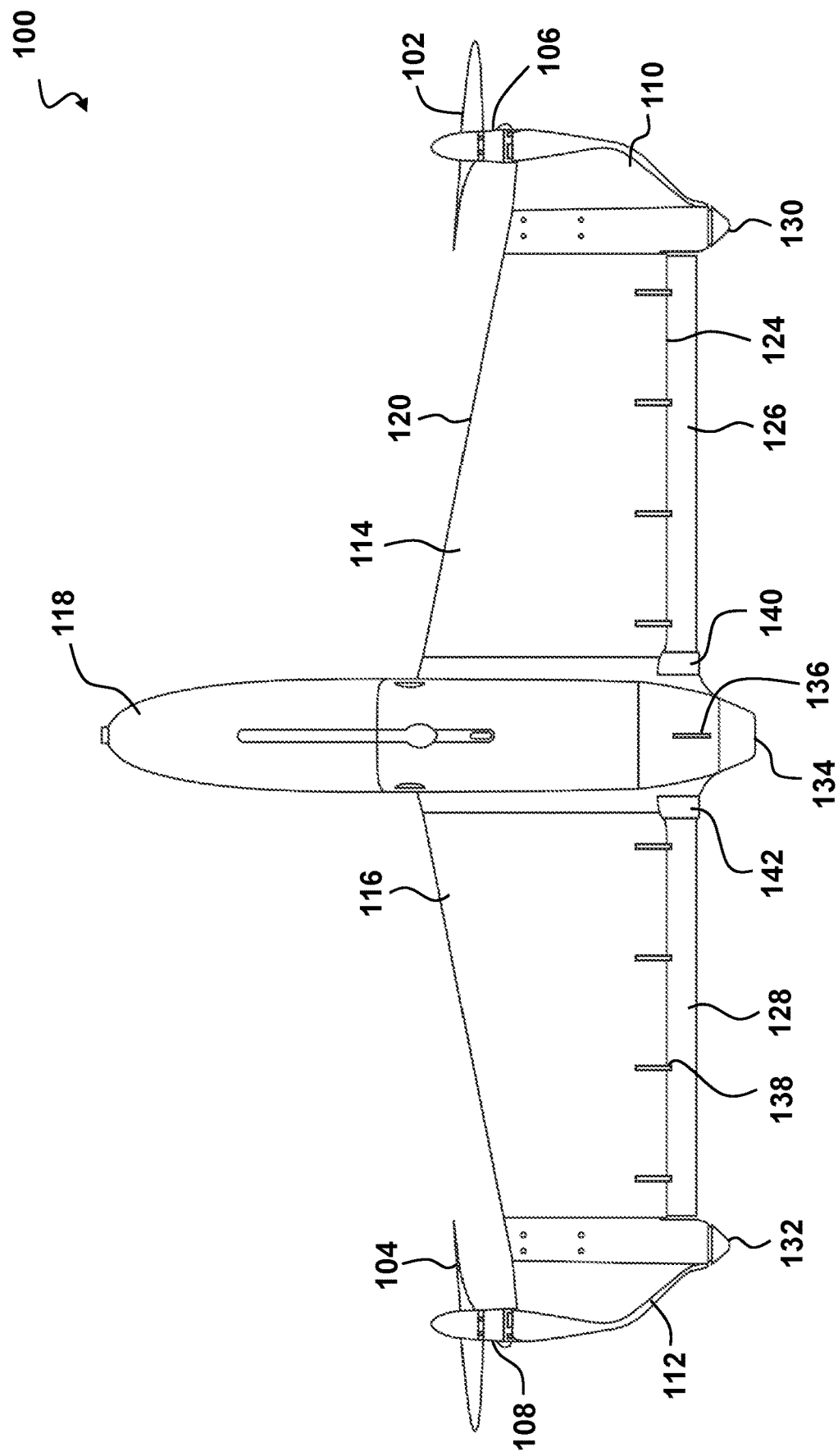
FIG. 1A depicts a front view of an exemplary vertical take-off and landing (VTOL) unmanned aerial vehicle (UAV)

FIG. 1A depicts a front view of an exemplary vertical take-off and landing (VTOL) unmanned aerial vehicle (UAV) 100. The VTOL UAV 100 may comprise four pairs of rotor or propellers 102, 104 with the second set of propellers hidden behind the first pair of propellers 102, 104, as shown in FIG. 1C. Motors 106, 108 mounted in respective motor pod structures 110, 112 drive the propellers 102, 104. The VTOL UAV 100 also includes a starboard wing 114 and a port wing 116 between the motor pod structures 110, 112 and a fuselage 118. Each wing 114, 116 may have a leading or first edge 120 and a trailing or second edge 124. A pair of control surfaces 126, 128 may be attached proximate the second edges 124 of each wing 114, 116. Starboard landing gear 130 may be disposed on a bottom edge of the motor pod structure 110 distal from the propeller 102. Port landing gear 132 may be disposed on a bottom edge of the motor pod structure 112 distal from the propeller 104. Central landing gear 134 may be disposed on a bottom edge of the fuselage 118 proximate a vertical stabilizer 136. In some embodiments, the vertical stabilizer 136 may act as landing gear to prevent tipping of the VTOL UAV 100.

In one embodiment, VTOL aerial vehicles may take-off vertically, transition from vertical flight to horizontal flight, and fly forward horizontally. Quadrotor aerial vehicles have four motors and four propellers that are all aligned vertically toward a longitudinal axis of the quadrotor. The size of the propellers in a quadrotor is significant relative to the overall size of the quadrotor in order to provide appropriate control over the quadrotor and to reduce the power required to fly the quadrotor. The aerial vehicle may be controlled by an on-board control system that adjusts thrust to each of the motors and control surfaces 126, 128. The on-board control system may include a processor having addressable memory and may apply differential thrust of the motors to apply both forces and torque to the aerial vehicle. Accordingly, the control surfaces 126, 128 may play an important role in providing control of the UAV. Additionally, control surfaces produced using an exemplary extrusion process may be able to reduce weight and complexity. In one embodiment, control surfaces 126, 128 may be trailing edge wing elevons.

Figure 7:
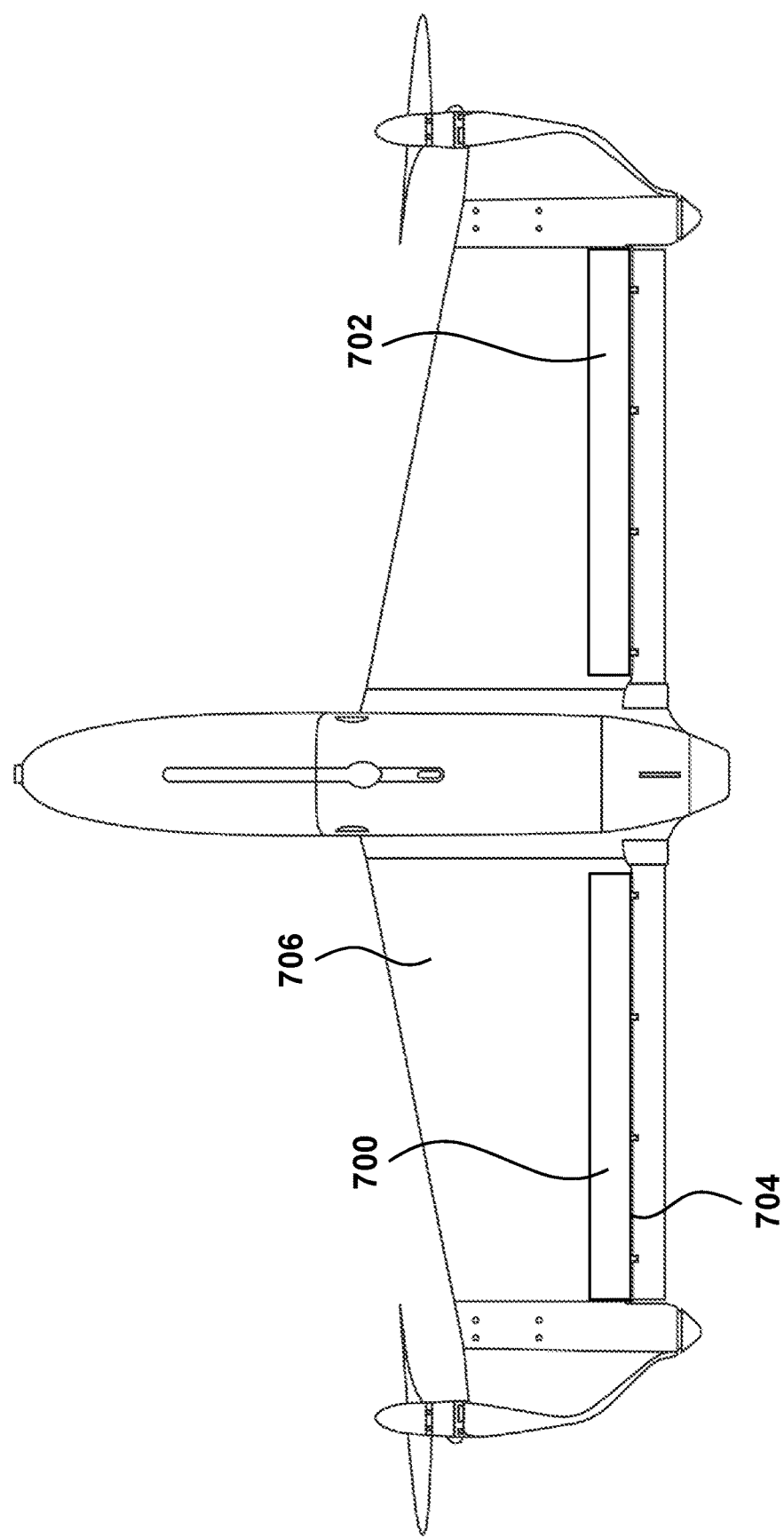
FIG. 7 depicts an alternate exemplary clip for attaching an exemplary control surface.

In other embodiments, the control surfaces 126, 128 may optionally be rudders, elevators, flaps, ailerons, speed brakes, etc. A series of exemplary clips 138 may be spaced along the length of the wings 114, 116 to connect the wings 114, 116 to the control surfaces 126, 128. In some embodiments, the clips 138 may be replaced with a more substantial connector, as shown in FIG. 7.

The fuselage 118 and motor pod structures 110, 112 may be made from plastic, e.g., using an injection molding process. The wings 114, 116 may be made from molded foam so as to minimize weight and maximize flight time of the VTOL UAV 100. Injection molded wings would add a significant weight to the VTOL UAV 100. In some UAV embodiments, the molded foam wings may form a live hinge where the foam is compressed. This live hinge is subject to breaking or be separated into pieces as a result of a blow, shock, or strain. A piece of tape of other material may be applied over the live hinge to extend its use, but this does not substantially extend the use. Molded foam wings may be limited in cross-section to about 3-5 mm in thickness, as compared to a thickness of about 2 mm of the trailing edge in the disclosed control surface 126, 128. Further, molded foam wings having a narrow cross section may need to be hand trimmed and may suffer from a very high rejection rate as compared to the disclosed extruded plastic control surfaces 126, 128.

The molded foam wings 114, 116 may include a plurality of recesses to receive the plurality of clips 138 for attaching the control surfaces 126, 128 to the wings 114, 116. The molded foam wings 114, 116 may be especially susceptible to damage from denting as compared to the plastic fuselage 118 and motor pod structures 110, 112. If the VTOL UAV 100 were to land on an uneven surface or a surface with one or more obstacles, such as rocks, the foam wings 114, 116 could be dented. Denting of the foam wings 114, 116 may cause a loss of efficiency or maneuverability of the VTOL UAV 100. In some embodiments, damage to the wings 114, 116 may necessitate a repair or replacement of the wings. In one embodiment of the VTOL UAV 100, the control surfaces 126, 128 may be used as disposable wing protectors. That is, since the VTOL UAV 100 may take-off and land in a vertical orientation, it makes the foam wings 114, 116 susceptible to damage during take-off and landing. The control surfaces 126, 128 may be positioned between the ground and the wings 114, 116 in order to absorb any damage incurred during take-off and landing that would otherwise damage the foam wings 114, 116. Accordingly, by acting as a barrier between the foam wings 114, 116 and the ground, the control surfaces 114, 116 may provide a disposable extruded protection system whereby the extruded protection system may, upon sustaining any damage, be restored. The control surfaces 114, 116 may be easily replaced by a user at a minimal cost if damaged.

In one embodiment the control surfaces 126, 128 may be made from an extruded plastic. Additionally, in some embodiments, control surfaces 126, 128 may be made from a UV resistant plastic so as not to degrade during use of the VTOL UAV 100. In some embodiments, the control surfaces 126, 128 may be made from polycarbonate-ABS (PC-ABS). These control surfaces 126, 128 may act to protect the wings 114, 116 from denting as the control surfaces 126, 128 are disposed between the easily dented foam wings 114, 116 and the ground during vertical landing of the VTOL UAV 100. If the VTOL UAV 100 were to land in an area with hard objects such as, a rock, the control surface 126 may forcibly contact the rock before the wing 114 impacts the rock, causing the control surface to deflect or absorb the impact, while preventing damage to the wing 114. As a result of an impact, the harder plastic surface of the control surface 126 may be scratched or deflected, but not materially damaged. If the control surface 126 were damaged, it could be quickly replaced by a user at a lower cost and shorter time than replacing the foam wing 114. In some embodiments, the control surface 126 may act as a wing 114 protection system and device.

Figure 3A:
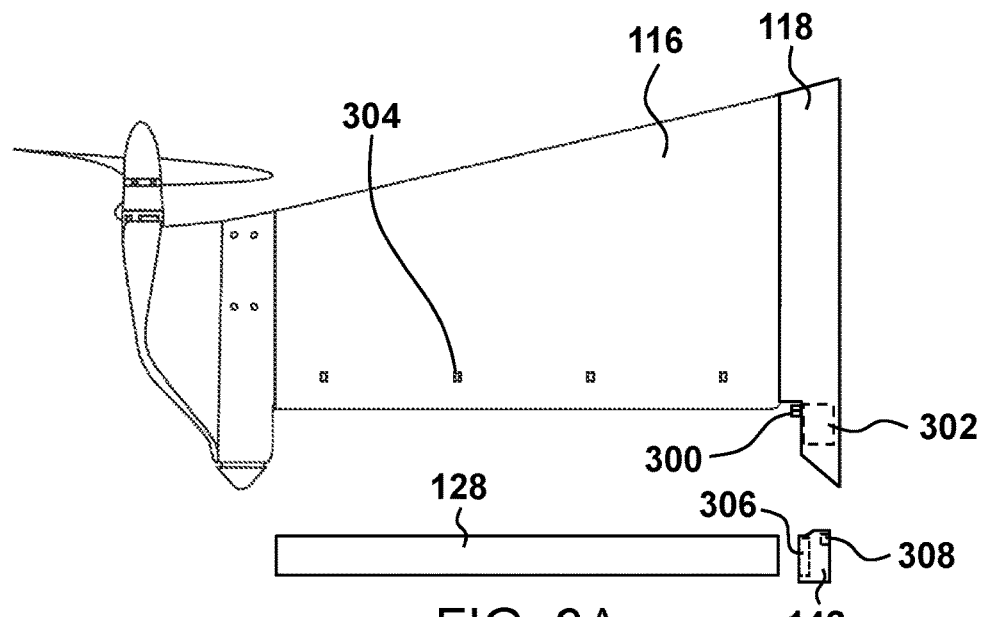
FIGS. 3A-3C depict top views of the control surface, cuff, servo connector, clip, and servo being connected to an exemplary VTOL UAV.

A pair of cuffs 140, 142 may be fit over an end of each control surface 126, 128 proximate to the fuselage 118 of the VTOL UAV 100. The cuffs 140, 142 may be fit to each control surface 126, 128 via a friction fit, snap-fit, and/or an adhesive. A first direct drive servo may be used to adjust control surface 128, as shown in FIG. 3A. A second direct drive servo may be used to adjust control surface 126, as shown in FIG. 1A.

Figure 1B:
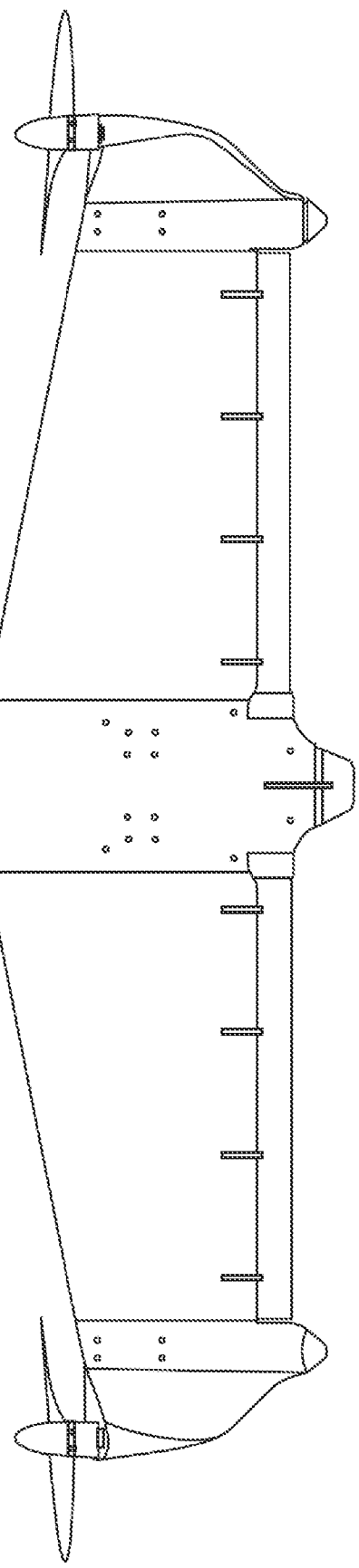
FIG. 1B depicts a rear view of the exemplary VTOL UAV of FIG. 1A.
Figure 1C:
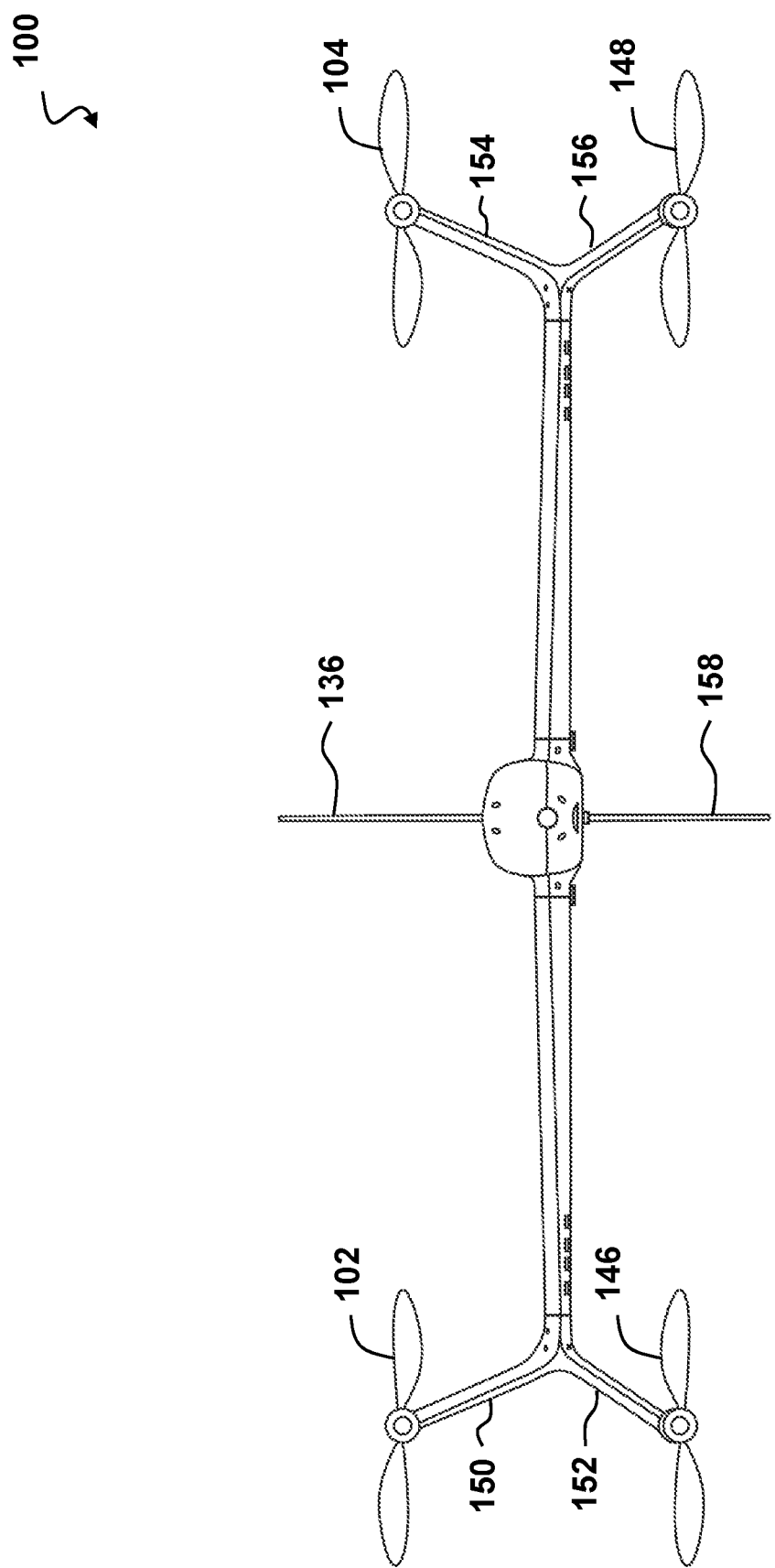
FIG. 1C depicts a top view of the exemplary VTOL UAV of FIG. 1A.
Figure 1D:
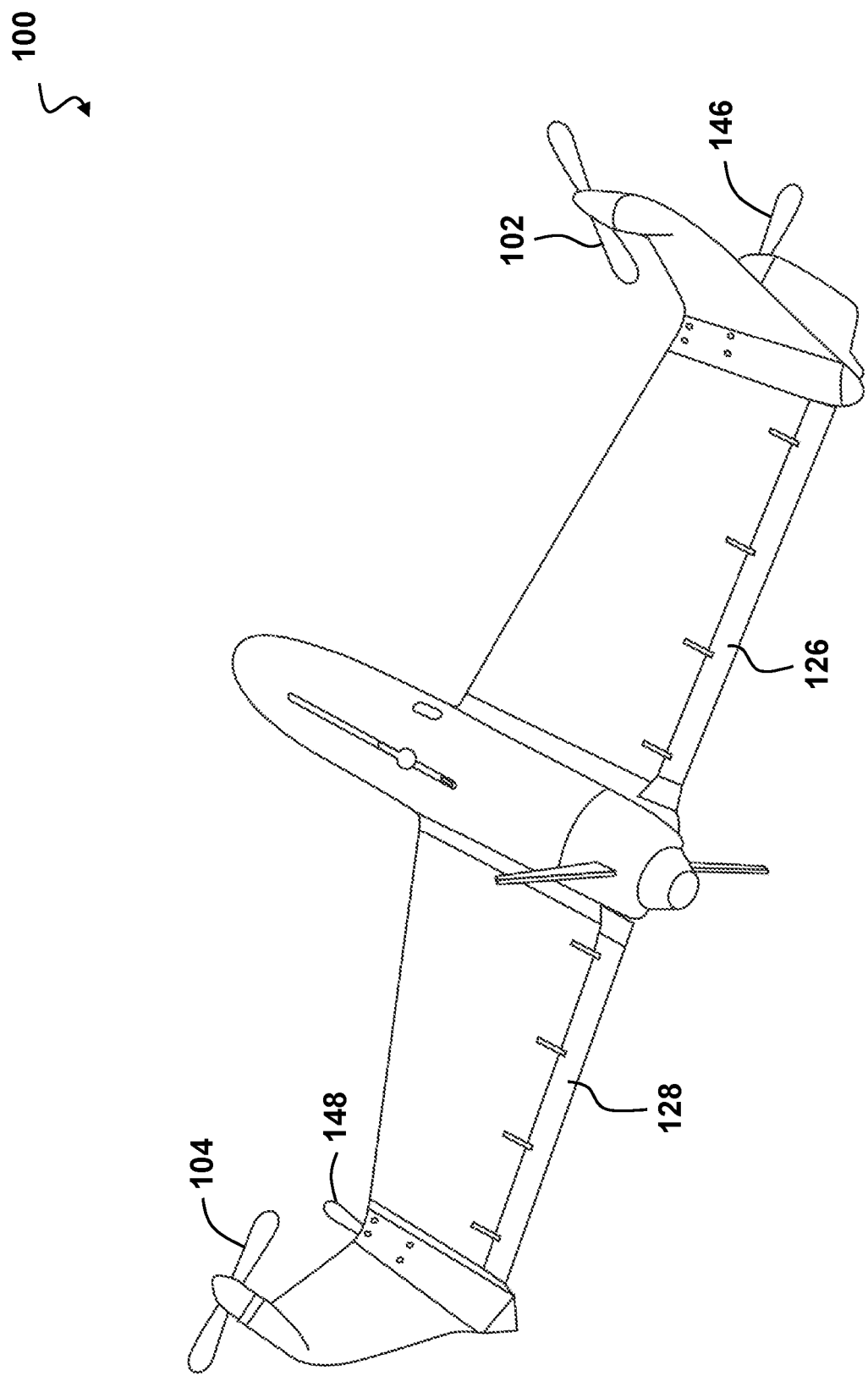
FIG. 1D depicts a perspective view of the exemplary VTOL UAV of FIG. 1A.

FIG. 1B depicts a rear view of the exemplary VTOL UAV 100 of FIG. 1A. One or more sensors 144 may be disposed in the fuselage 118 of the VTOL UAV 100. FIG. 1C depicts a top view of the exemplary VTOL UAV 100 of FIG. 1A. The VTOL UAV may include four propellers 102, 104, 146, 148 separated by winglets 150, 152, 154, 156. Vertical stabilizers 136, 158 may be used to prevent tip over of the VTOL UAV 100 upon landing. FIG. 1D depicts a perspective view of the exemplary VTOL UAV 100 of FIG. 1A. After vertical take-off, the VTOL UAV 100 may transition to horizontal flight to cover a greater area, and then transition back to a vertical orientation for landing. The VTOL UAV 100 may use the propellers 102, 104, 146, 148 and control surfaces 126, 128 to effect the transition between vertical and horizontal flight.

Figure 2A:
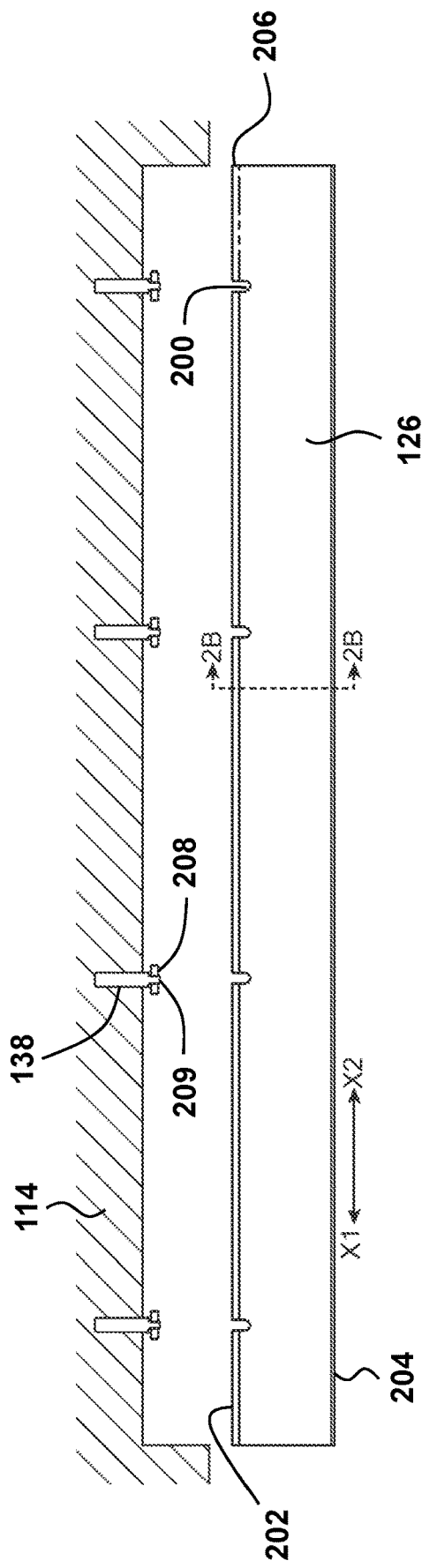
FIG. 2A depicts a top view of an exemplary control surface positioned apart from an exemplary wing of a VTOL UAV.

FIG. 2A depicts a top view of an exemplary control surface 126 positioned apart from an exemplary wing 114 of a VTOL UAV. The wing 114 may include a plurality of clips 138 disposed about the wing. The clips 138 may be attached in a recess in the wing 114. In some embodiments, the clips 138 may be secured to the wing via an adhesive.

The control surface 126 may include a plurality of notches 200 that correspond to the placement of the plurality of clips 138, such that the notches 200 may accept the clips 138 and allow rotation of the control surface 126 about the attachment point of the clips 138. The notches 200 may be disposed in a leading edge 202 of the control surface 126 distal from a tapered trailing edge 204. The notches 200 include portions laterally about both sides of the notches 200. A cavity structure or channel 206 is defined at the leading edge 202 of the control surface 126, running laterally along the entire length of the control surface 126. The channel 206 is shaped and sized to receive a pin 208 extending from either side of a base 209 of the clip 138 to allow the control surface 126 to rotate about the pin 208.

The control surface 126 has a constant cross-section along its length which results from the extrusion of the material, such as a plastic, in the lateral direction of either X1 or X2, as shown in the cross-section 2B. In one embodiment, at least one pin 208 of each clip may be received by the knuckle 210 of the control surface 126 via the channel 206, where the knuckle provides a bend or bows to accept the pin. Additionally, the control surface 126 may pivot about each pin, thereby effecting a movement for providing control to the UAV.

Figure 2B:
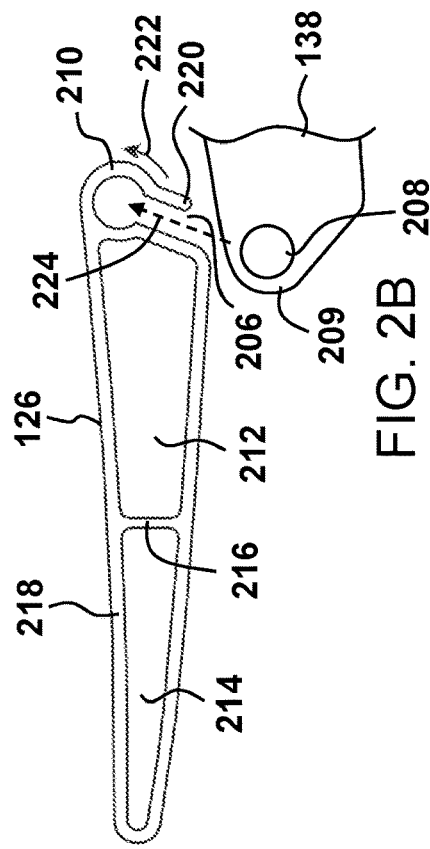
FIG. 2B depicts a cross-sectional view of the control surface of FIG. 2A with an exemplary clip.

FIG. 2B depicts a cross-sectional view of the control surface 126 of FIG. 2A with an exemplary clip 138. The shape of the control surface 126 cross-section is determined by the die, which the die was extruded through at the time of manufacture. The cross-section, via the die, defines not only the exterior shape of the control surface, but also the channel 206, a knuckle 210, a leading void 212, a trailing void 214, and a separator 216 dividing the leading void 212 and the trailing void 214. A thickness of the separator 216 may, for example, be about half a thickness of an outer wall 218 of the control surface 126. The separator 216 provides torsional strength to the control surface 126 and prevents the voids 212, 214 from collapsing inward as the control surface 126 is extruded during an extrusion process. In some embodiments, the control surface 126 may include a plurality of separators. The voids 212, 214 may be hollow in the form of two or more cavities, such as carveouts or tubes. In some embodiments, the voids 212, 214 may be filled with a foam or other material to add additional strength to the control surface 126.

A conduit such as a channel 206 may define the knuckle 210 allowing a leading edge portion 220 to deform 222 in the manner and direction shown by the arrow 224, so that the channel 206 may have the ability to expand to receive the pin 208 extending from the base 209 of the clip 138. The material used for the control surface 126 and the shape of the knuckle 210 and channel 206 provide the give needed to deform and return to its original shape. The knuckle 210 is sized to receive the pin 208 to allow free rotation thereabout, while minimizing the play between the pin 208 and the knuckle 210. The pin 208 may be inserted into the channel 206 of the knuckle 210 in the direction 224 shown in dashed arrow. The control surface 126 may be made of sufficiently flexible material to allow attachment and/or detachment of the control surface 126 at knuckle points at separate times, easing the installation or removal of the control surface 126.

Figure 2C:
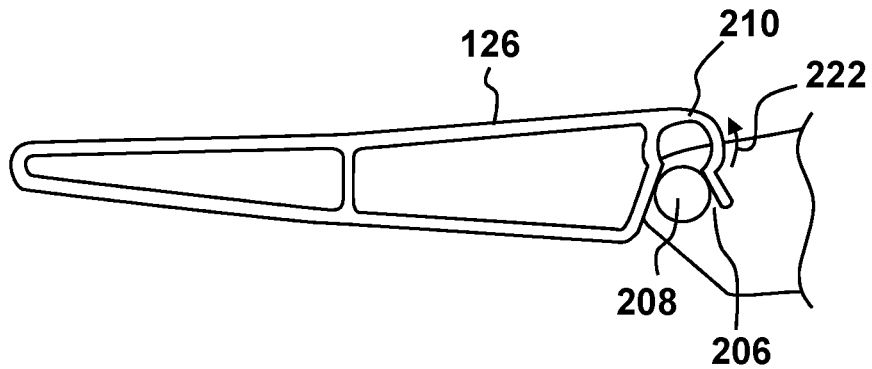
FIG. 2C depicts the control surface of FIG. 2B deflecting to insert a pin of the exemplary clip.

FIG. 2C depicts the control surface 126 of FIG. 2B deflecting to insert the pin 208 of the exemplary clip 138. The knuckle 210 deflects or deforms in an outward direction 222 to allow the pin 208 of the clip 138 to enter the channel 206.

Figure 2D:
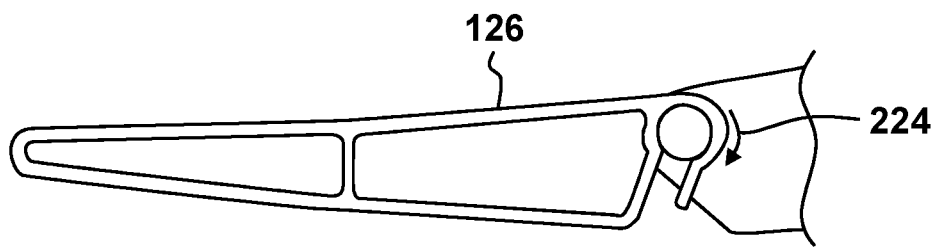
FIG. 2D depicts a view of the control surface of FIG. 2B with the pin of the exemplary clip inserted into the channel in the exemplary clip.

FIG. 2D depicts a view of the control surface of FIG. 2B with the pin 208 of the exemplary clip 138 inserted into the channel 206 of the exemplary clip. As the pin 208 enters a final position in the channel 206 the knuckle 210 deforms 224 back to its original position in the direction indicated by the arrow 224. The pin 208 of the clip 138 may be secured to the control surface 126 via a snap-fit. The control surface 138 may be secured to the clip 138 by hand and without any screws, special tools, or specific knowledge. A user may replace the control surface 138 in the field if the control surface 138 is damaged or otherwise needs replacement. The clip 138 may be detached from the control surface 126 following an opposite movement where the control surface 126 is moved up and away from the clip 138 causing the knuckle 210 to deflect as the clip 138 is removed from the knuckle 210 in a snap-action. The knuckle may have sufficient resilience to prevent accidental removal, while still providing ease of installation or removal by a user.

The knuckle 210 may be disposed proximate a leading edge of the control surface 126. In one embodiment, the knuckle 210 may have a crescent shape cross-section proximate a top side of the control surface 126, with the opening of the knuckle 210 oriented toward a bottom side of the control surface 126. The leading edge portion 220 of the knuckle may extend from the crescent shape cross section toward the bottom side of the control surface 126. The leading edge portion 220 may extend far enough from the crescent shape portion of the knuckle 210 to allow a user to manipulate the leading edge portion 220. By pushing the leading edge portion 220 away from the leading void 212, the knuckle 210 deforms, allowing the 208 of the clip 138 to be removed from the knuckle 210. The user may be able to manipulate the leading edge portion 220 to allow easy insertion and/or removal of the pin 208 of the clip 138 from the knuckle 210 of the control surface 126.

Figure 3B:
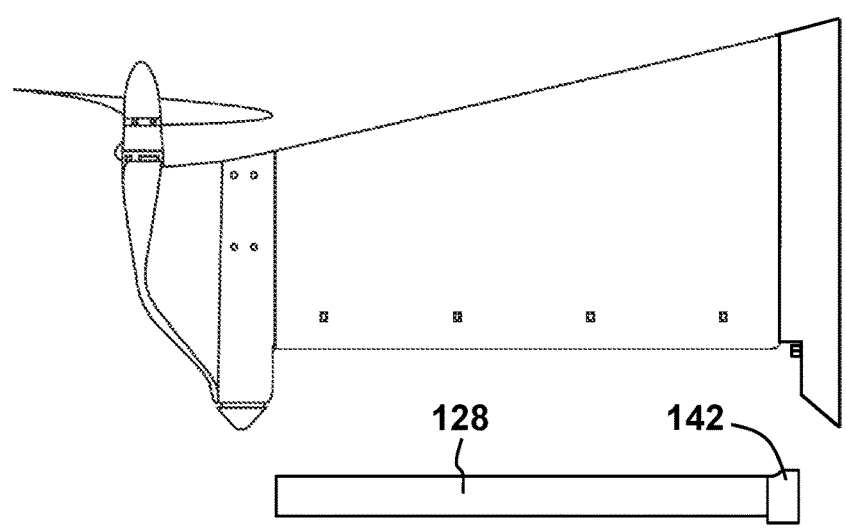
Figure 3C:
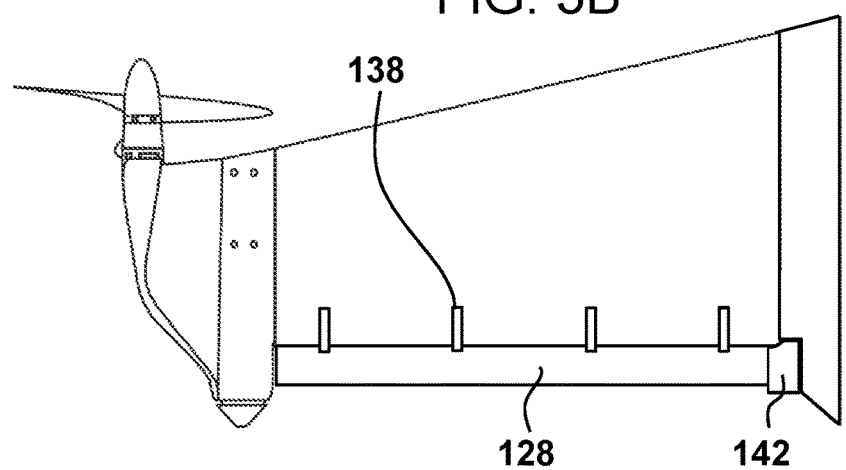
Figure 4A:
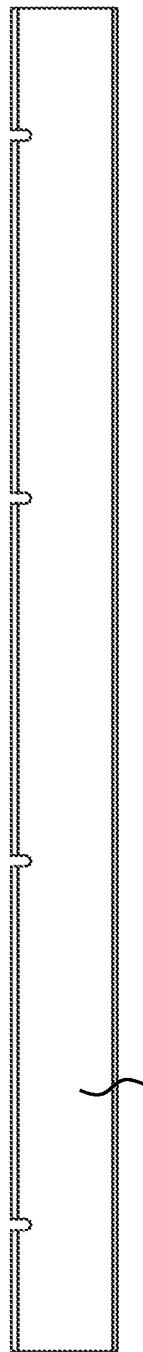
FIGS. 4A-4D depict top, side, close-up, and perspective views, respectively, of the exemplary control surface.
Figure 4B:
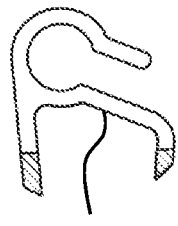
Figure 4C:
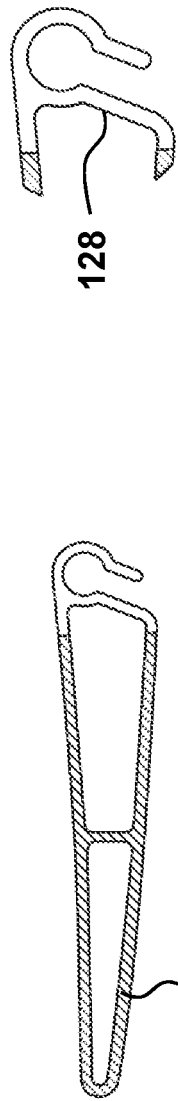
Figure 4D:
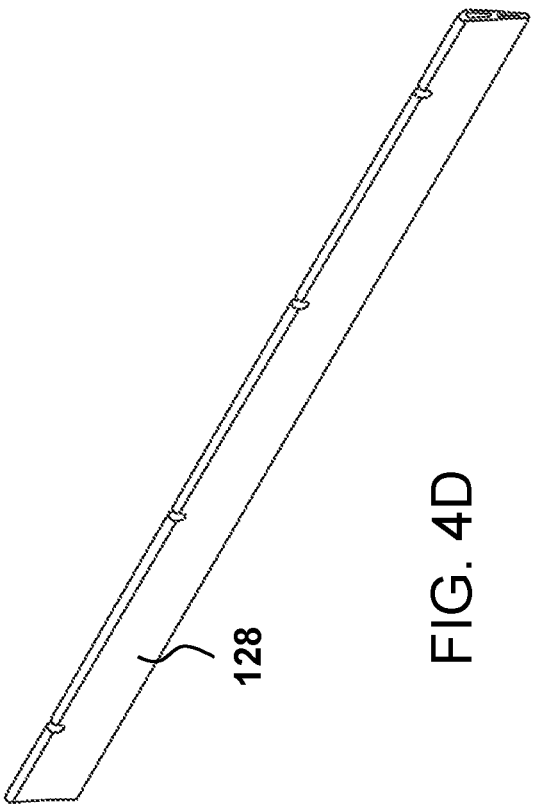
Figure 6F:
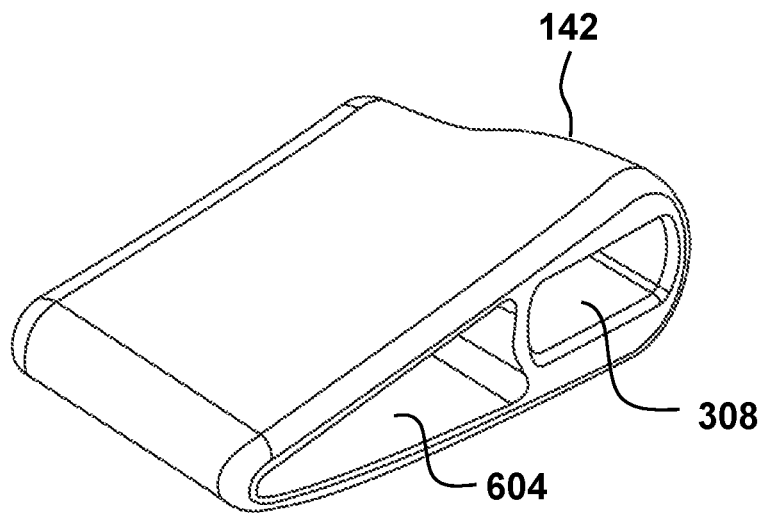
Figure 6G:
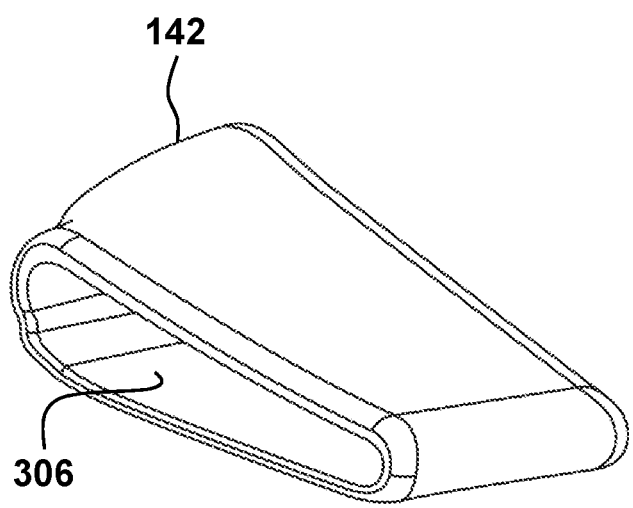

FIGS. 3A-3C depict top views of the control surface 128, cuff 142, servo connector 300, clip 138, and servo 302 being connected to an exemplary VTOL UAV. The wing 116 may include a plurality of indentations 304 for receiving a portion of a clip. The indentations may be shallow to provide enough surface area for the clip to have a suitable bonding surface on the foam of the wing. The control surface 128 may be fit into a first cuff cavity 306, shown in dashed lines, in the cuff 142. The cuff 142 may be fit over the control surface 128 via an interference fit to allow for quick removal of the control surface 128 from the cuff 142, such as if the control surface 128 is damaged by an obstacle in landing while protecting the wing 116. In some embodiments, an adhesive may be used in the first cuff cavity 306 to secure the cuff 142 to the control surface 128.

A servo connector 300 may extend out from the fuselage 118 of the VTOL UAV. The servo connector 300 may be received in a second cuff cavity 308 disposed on a side distal from the first cuff cavity 306. The second cuff cavity 308 may receive the servo connector via an interference fit. The servo connector 300 may be a split connector that may close upon being fit into the second cuff cavity 308 to ensure a secure fit between the servo connector 300 and the cuff 142.

The servo 302 may be disposed in the fuselage 118. The servo 302 may be a direct drive servo to ensure longevity and prevent any damage to gears, such as during a deflection of the control surface 128 upon encountering an obstacle during a landing of the VTOL UAV. The interference fit between the servo connector 300 and the cuff 142 also ensures that control of the control surface 128 is maintained even if the wing 116 is partially separated from the fuselage 118, such as may occur if the VTOL UAV lands corner first causing forces to separate the wing 116 from the fuselage 118 to prevent damage to the foam wing 116. The control surface 128, clips 138, and cuff 142 may each be detachably attached and replaced if desired by the user of the VTOL UAV.

FIGS. 4A-4D depict top, side, close-up, and perspective views, respectively, of the exemplary control surface 128.

FIGS. 5A-5F depict top, side, cross-sectional, close-up, front, and perspective views of an exemplary clip 138. Two pins 208 extend from a base 209 of the clip 138. The pins 208 may have tapered ends to aid in ease of installation of the pins 208 in the control surface. The clip 138 may have a top or first leg 500 and a bottom or second leg 502. The first leg 500 may include a first protrusion 504 for insertion into an indentation on a top surface of a VTOL UAV wing, as shown in FIG. 3A. The second leg 502 may include a second protrusion 506 for insertion into an indentation on a bottom surface of the VTOL UAV wing. In some embodiments, the first leg 500 and second leg 502 may be designed so as to prevent incorrect, or backward, installation of the clip 138, e.g., via a non-symmetrical poka-yoke design that only allows the clip 138 to be installed in one orientation.

FIGS. 6A-6G depict top, left side, cross-sectional, right side, front, front perspective, and rear perspective views, respectively, of an exemplary cuff 142. The cuff 142 may include a first side 600 disposed proximate a fuselage of the UAV when installed, and a second side 602 distal from the first side 600 and proximate a control surface when installed. The cuff 142 may include a plurality of cavities. The first cavity 306 may be sized to receive the control surface, also shown in FIG. 3A. The second cavity 308 may be sized to receive the servo connector, as shown in FIG. 3A. In some embodiments, the cuff 142 may include additional cavities, such as a third cavity 604 to reduce weight of the cuff 142. The cuff may be created via injection molding and made from a plastic.

FIG. 7 depicts an alternate exemplary clip 700, 702 for attaching an exemplary control surface. The clip 700, 702 may extend across a trailing edge 704 of the wing 706 of the VTOL UAV 708. The greater surface area of the clip 700, 702 may distribute the load and limit forces on the wing 706, which may cause denting of a foam wing. The clip 700, 702 may be made from injection molding, such as an injection molded plastic.

Figure 8:
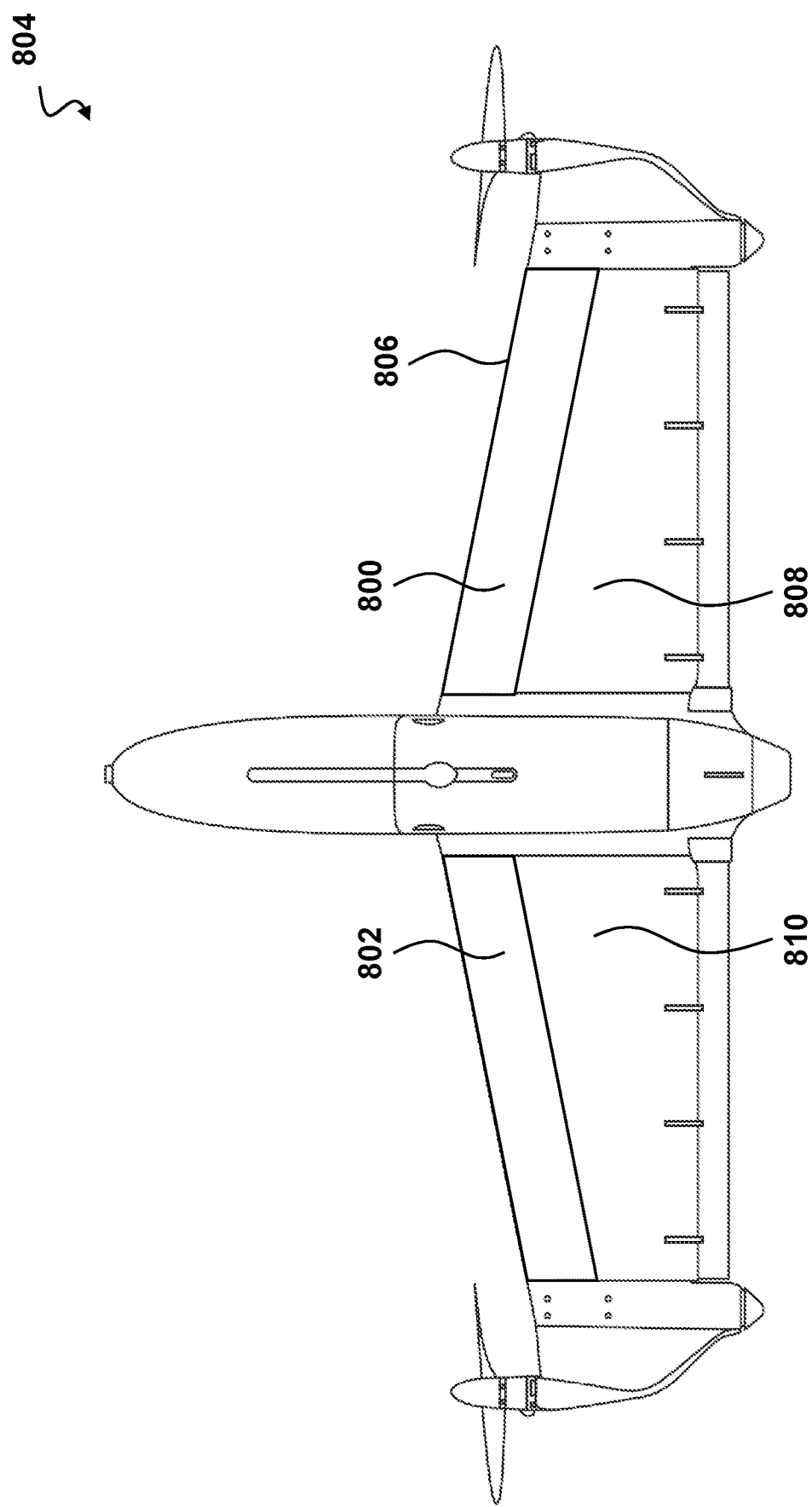
FIG. 8 depicts an exemplary wing protector for an exemplary VTOL UAV.

FIG. 8 depicts an exemplary wing protector 800, 802 for an exemplary VTOL UAV 804. The wing protector 800, 802 may extend across a leading edge 806 of the wing 808, 810. The foam wing 808, 810 may be especially susceptible to damage from user handling, e.g., the foam may form indentations from user fingers. The wing protector 800, 802 may be formed via extrusion via a die. In other embodiments, the wing protector 800, 802 may be formed via injection molding. The wing 808, 810 of the VTOL UAV 804 has some twist in it, i.e., it is not perfectly straight. In embodiments where the wing protector 800, 802 is formed via extrusion the wing protector 800, 802 may be processed to add a twist. In other embodiments, the difference in the twist may not be significant enough to require further processing.

Figure 9:
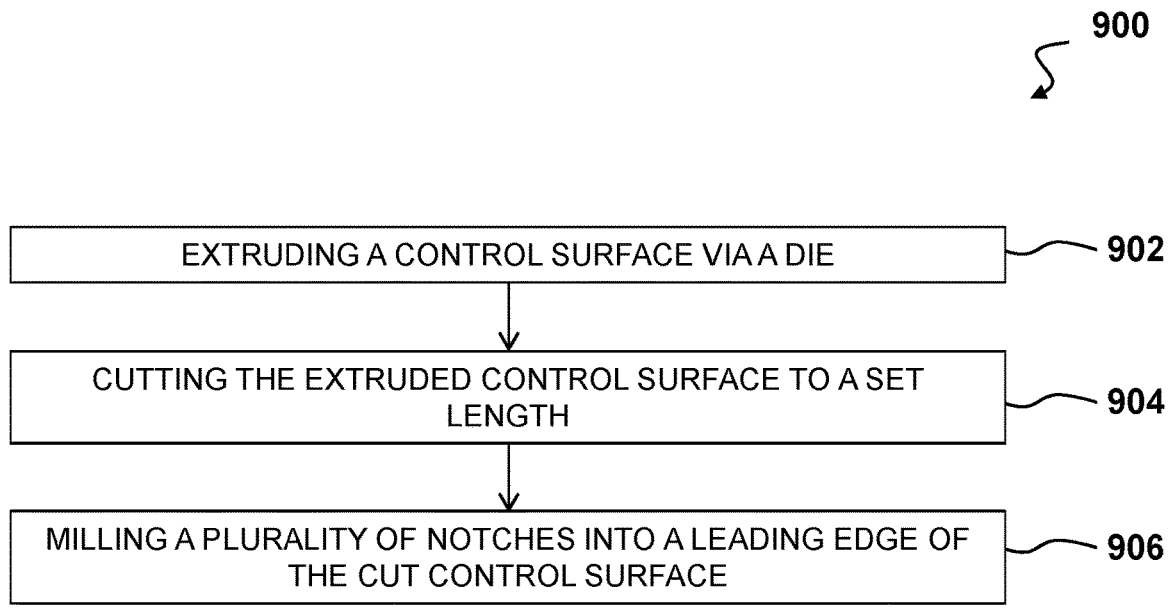
FIG. 9 depicts a flowchart of a method of producing an exemplary extruded control surface.

FIG. 9 depicts a flowchart of a method 900 of producing an exemplary extruded control surface. A control surface is extruded via a die (step 902). A vacuum may be used to prevent the control surface from collapsing in on itself during the extruding process. The extruded control surface may include a knuckle, a channel, a leading void, a trailing void, and a separator dividing the leading void and the trailing void. The control surface is cut to a set length (step 904). The set length may be a desired length of a control surface or wing protector. A plurality of notches are milled into the control surface proximate the leading edge of the control surface (step 906). The notches may be milled via a computer numerical control (CNC) machine, e.g., a CNC router. The notches may be milled at set intervals to align with clips to attach the notches to a wing of a VTOL UAV.

Figure 10:
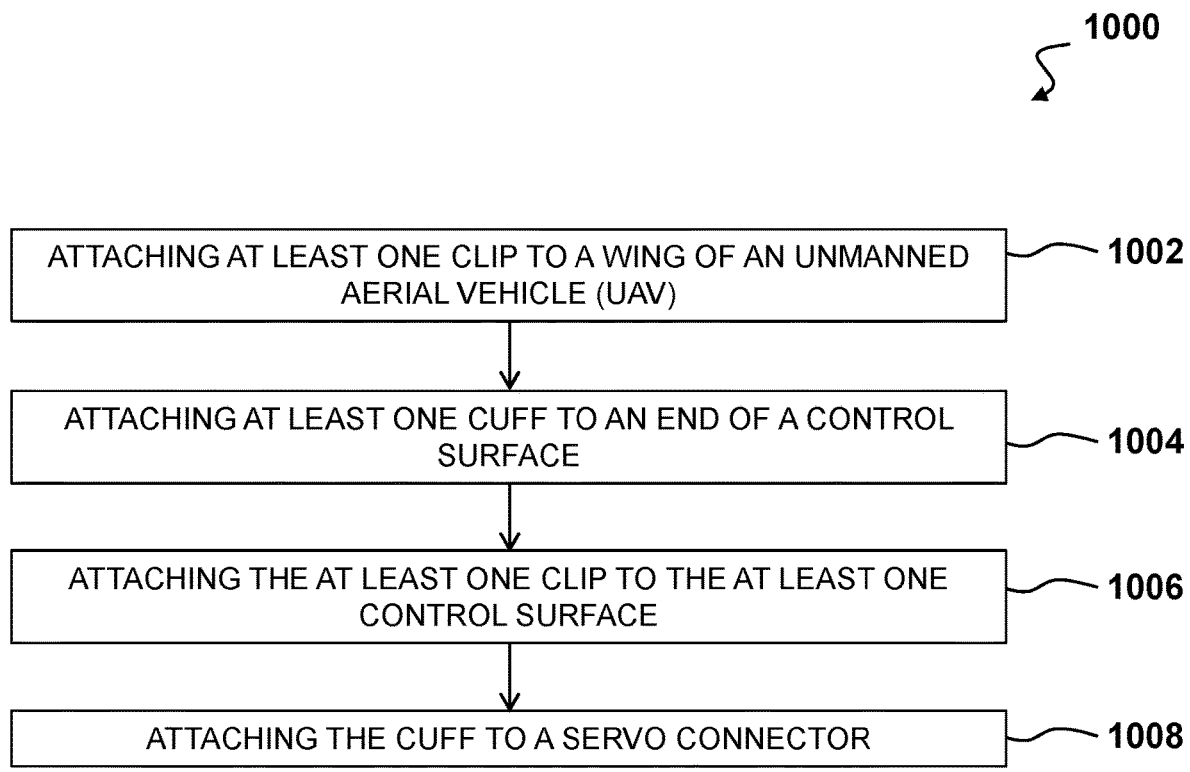
FIG. 10 depicts a flowchart of a method of assembling an exemplary VTOL UAV.

FIG. 10 depicts a flowchart of a method 1000 of assembling an exemplary VTOL UAV. At least one clip is attached to a wing of a VTOL UAV (step 1002). At least one cuff is detachably attached to an end of a control surface (step 1004). At least one pin of the at least one clip is detachably attached to the control surface via a channel of the control surface proximate at least one notch of the control surface (step 1006). In one embodiment, a servo connector is detachably attached to the cuff via a cavity of the cuff (step 1008).

Figure 11:
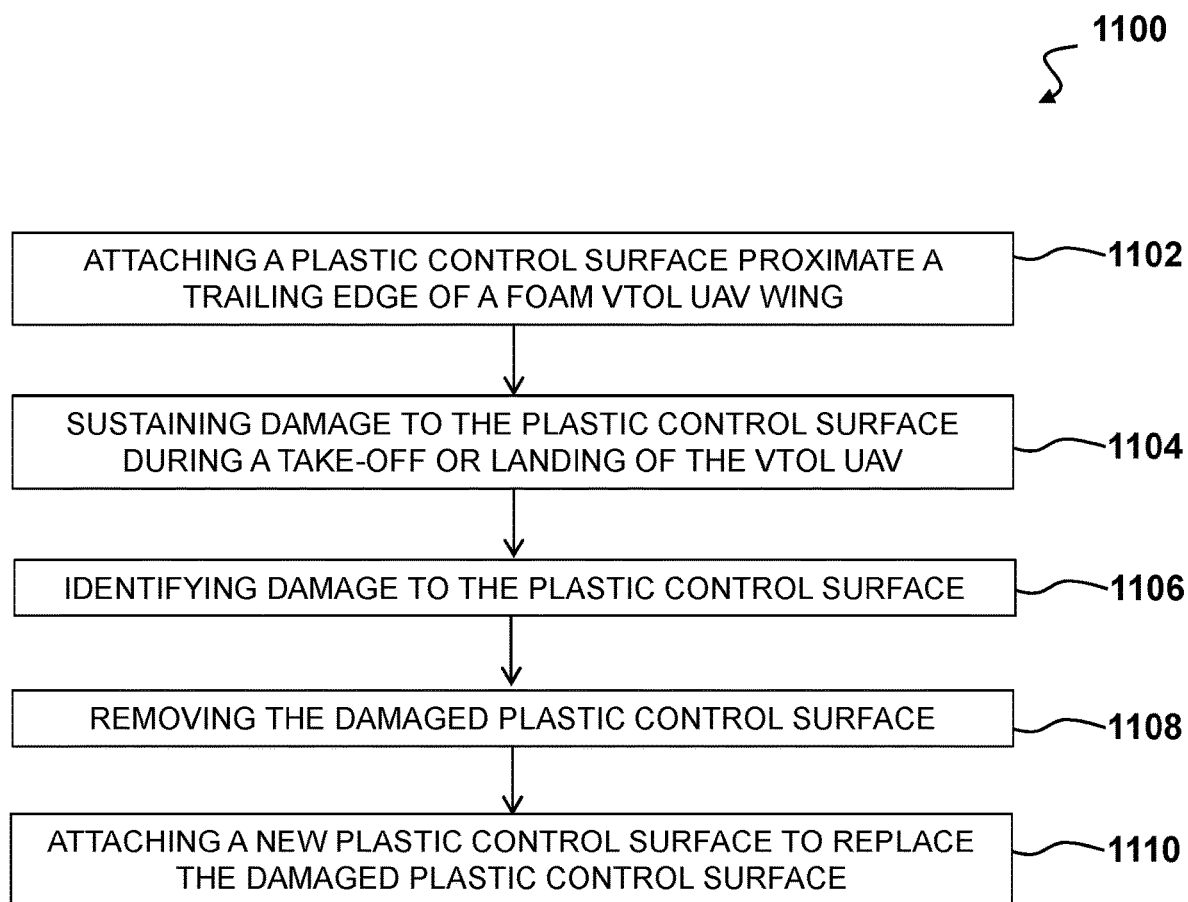
FIG. 11 depicts a flowchart of a method of protecting a wing of an exemplary VTOL UAV from damage.

FIG. 11 depicts a flowchart of a method 1100 of protecting a wing of an exemplary VTOL UAV from sustaining damage. A user may attach a plastic control surface, such as a plastic extruded control surface disclosed herein, proximate a trailing edge of a foam VTOL UAV wing (step 1102). The control surface may be disposed between the foam wing and the ground while the UAV is in a vertical orientation. The plastic extruded control surface may sustain damage during a take-off or landing of the VTOL UAV (step 1104). The control surface may impact any objects, e.g., rocks, uneven ground, obstacles, etc., during vertical flight prior to impacting the foam wing. As a result, the control surface may sustain damage and need replacement, but the wing may be protected and not needed to be replaced or repaired. Damage to the plastic control surface may be identified (step 1106).

A user, operator, or a software system may provide notification that the plastic control surface has been damaged. For minor damage, such as cosmetic damage or light scratches, repair or replacement may not be necessary. For severe damage, such as cracks, punctures, bends, etc., the control surface may need to be replaced. Absent the extruded plastic control surface, damage to the control surface may otherwise have caused damage to the foam wings. The damaged plastic control surface may be removed (step 1108). A user may easily remove the extruded plastic control surface disclosed herein via a snap-off action. The user may bend an edge of the knuckle to allow a pin of the clip to be removed from the channel of the control surface. A new plastic control surface may then be attached to replace the damaged plastic control surface (step 1110).

Due to the low cost, ease of identifying damage, ease of removal, and ease of installation, the plastic control surface may be frequently replaced while still keeping the operation of the VTOL UAV economical. In some embodiments, the plastic control surfaces may be replaced every set number of flights to ensure that the control surfaces provide protection to the foam wings.

Figure 12:
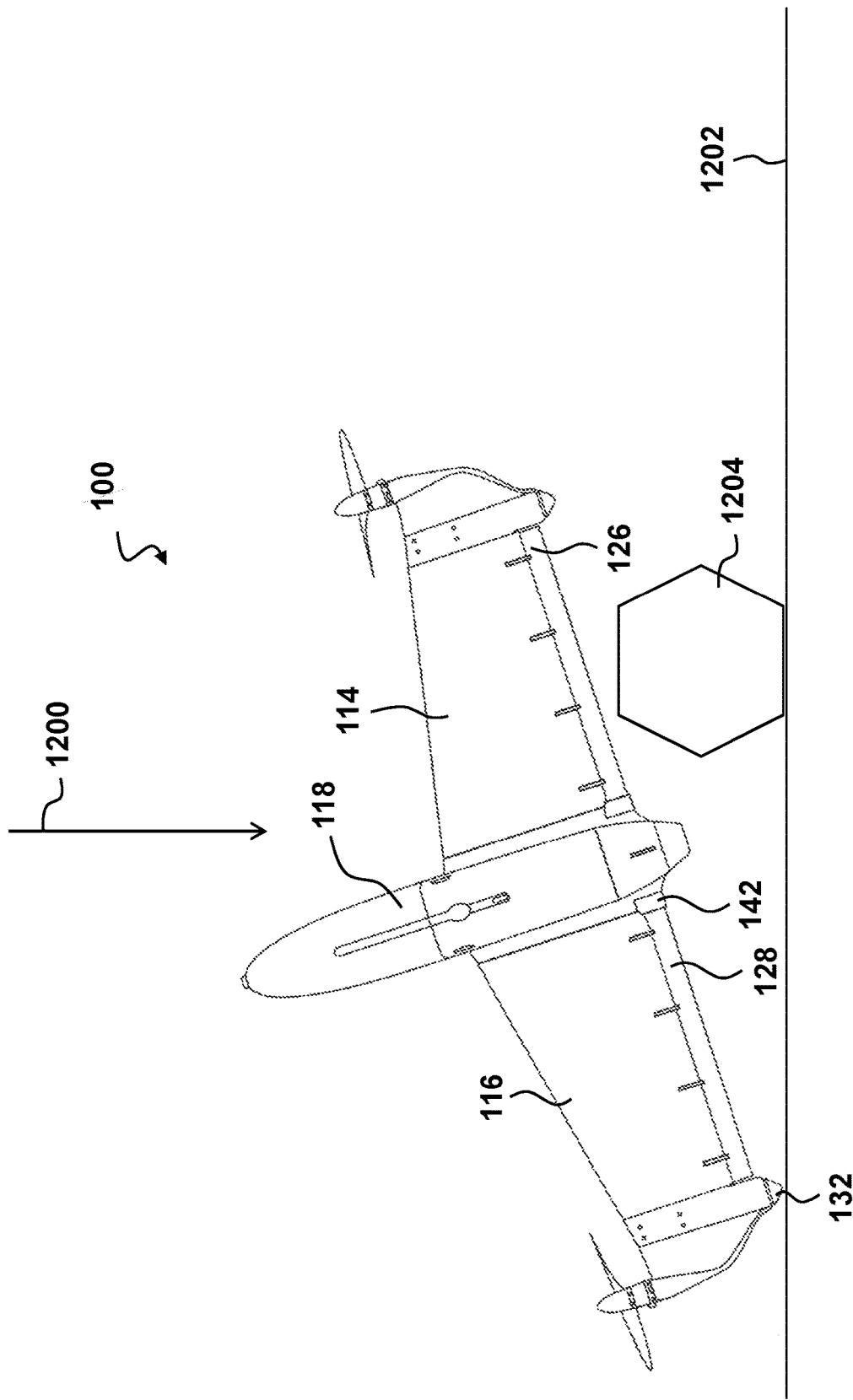
FIG. 12 depicts a front view of the exemplary VTOL UAV of FIG. 1A landing at an angle.

FIG. 12 depicts a front view of the exemplary VTOL UAV 100 of FIG. 1A landing at an angle. The UAV 100 may descend 1200 vertically toward the ground 1202. The UAV 100 may not land in a vertical orientation due to an error, strong winds, etc. In such a case, the UAV 100 may first contact the ground 1202 at port landing gear 132. The impact between the port landing gear 132 and the ground 1202 may cause some separation between the port wing 116 and the fuselage 118 to prevent breaking, cracking, or tearing of the wing 116. The cuff 142 is fit to control surface 128. The cuff 142 may separate from the fuselage 118 and the servo connector extending from the fuselage, as shown in FIG. 3A. Since the servo connector fits into the second cuff cavity of the cuff 142, as shown in FIG. 3A, the servo may continue to adjust the orientation of the control surface 128 during the non-vertical impact as shown in FIG. 12. This continued control could allow the UAV 100 to abort the landing while maintaining the maneuverability needed from its control surfaces 126, 128, e.g., to maneuver the UAV vertically away from the ground 1202 until the wind has subsided enough to allow for a near vertical landing. A fixed connection between a servo and a control surface could cause damage to the servo in the impact shown in FIG. 12, which would be significantly more costly to replace than the control surface 128.

The ground 1202 may include one or more obstacles 1204, such as rocks. As the UAV 100 descends 1200, it may contact the obstacle 1204 in its landing location. The control surface 126 may absorb the impact of the UAV 100 with the obstacle 1204 such that the control surface 126 is damaged or destroyed, but the foam wing 114 is not damaged. The control surfaces 126, 128 are disposed at the trailing edge of the foam wings 114, 116 and are positioned between the foam wings 114, 116 and the ground 1202. It is easier and less expensive for a user to continually replace the control surfaces 126, 128 than to repair or replace the foam wings 114, 116. Due to the vertical take-off and landing of the VTOL UAV 1200, the UAV 100 is more likely to sustain damage to the trailing edge of the foam wings 114, 116 than in a horizontal take-off UAV. The plastic control surfaces 126, 128 provide protection for the more fragile wings 114, 116 without the need for heavier or more expensive damage resistant wings.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
   an extruded control surface comprising:
   a channel proximate a leading edge of the control surface; and
   a knuckle disposed about the channel, wherein the knuckle comprises a semi-circular portion and a leading edge portion, wherein the semi-circular portion comprises a semi-circular cross-section proximate a top side of the control surface, and wherein the leading edge portion extends from the semi-circular portion toward a bottom side of the control surface.

2. The system of claim 1 wherein the extruded control surface further comprises:
   a leading void;
   a trailing void; and
   a separator dividing the leading void and the trailing void.

3. The system of claim 1, further comprising:
   a plurality of notches disposed in the extruded control surface.

4. The system of claim 3, wherein the plurality of notches are disposed proximate the leading edge of the control surface.

5. The system of claim 1 further comprising:
   a plurality of clips, wherein each of the plurality of clips comprise at least one pin disposed proximate a base of the clip;
   wherein the at least one pin of each clip is received by the knuckle of the control surface via the channel, wherein the knuckle is the only part of the extruded control surface that deforms to accept the pin, and wherein the control surface pivots about each pin.

6. The system of claim 5 further comprising:
   at least one cuff, wherein the at least one cuff receives an end of the control surface in a first cavity of the cuff, wherein the at least one cuff further comprises: a second cavity disposed on a side distal from the first cavity, wherein the second cavity is distal from the first cavity; and
   a servo adapter, wherein the second cavity is sized to receive the servo adapter for controlling the control surface.

7. The system of claim 5, wherein each clip of the plurality of clips further comprise:
   a first leg comprising a first protrusion for insertion into an indentation on a top surface of a wing, wherein each pin is disposed in a plane substantially perpendicular to a plane of the first leg; and
   a second leg comprising a second protrusion for insertion into an indentation on a bottom surface of a wing.

8. The system of claim 5, wherein each pin is tapered, and wherein a narrow end of each pin is distal from the base.

9. The system of claim 2, wherein the trailing void is proximate to a trailing edge of the control surface.

10. The system of claim 1, wherein the knuckle comprises an opening facing towards a bottom surface of the control surface.

11. The system of claim 1 wherein the control surface is made from an Ultraviolet (UV) resistant plastic.

12. The system of claim 1 wherein the control surface is made from a polycarbonate-acrylonitrile butadiene styrene (PC-ABS).

13. A method comprising:
   extruding a control surface, wherein the extruded control surface comprises a channel proximate a leading edge of the control surface and a knuckle disposed about the channel, wherein the knuckle comprises a semi-circular portion and a leading edge portion, wherein the semi-circular portion comprises a semi-circular cross-section proximate a top side of the control surface, and wherein the leading edge portion extends from the semi-circular portion toward a bottom side of the control surface.

14. The method of claim 13, wherein the knuckle comprises an opening facing towards a bottom surface of the control surface.

15. The method of claim 13, further comprising:
   cutting the control surface at a set length.

16. The method of claim 15, further comprising:
   milling a plurality of notches into the cut control surface proximate the leading edge of the control surface.

17. The method of claim 15, further comprising:
   attaching a cuff to an end of the cut control surface, wherein the control surface is received in a first cavity of the cuff.

18. The method of claim 16, further comprising:
   attaching at least one pin of each clip of a plurality of clips to the knuckle of the extruded control surface, wherein the knuckle is the only part of the extruded control surface that deforms to accept the pin, and wherein the control surface pivots about each pin.

19. The method of claim 13, wherein the extruded control surface further comprises: a leading void, a trailing void, and a separator dividing the leading void and the trailing void, wherein the trailing void is proximate to a trailing edge of the control surface.

20. The method of claim 19, wherein the separator is narrower in width than an outside width of the control surface.

* * * * *